United States Patent Office 2,974,129
Patented Mar. 7, 1961

2,974,129

PROCESS FOR PREPARING POLYVINYL CHLORIDE USEFUL IN PLASTISOLS

Alfred R. Nelson, Bay City, and Erwin M. Jankowiak, Midland, Mich., assignors to The Dow Chemical Company, Midland, Mich., a corporation of Delaware No Drawing. Filed Mar. 1, 1957, Ser. No. 643,215

2 Claims. (Cl. 260—92.8)

This invention relates to a process for preparing polymers suitable for use in plastisols. More particularly it relates to such a process wherein the monomers are polymerized into a form useful in plastisols.

A plastisol may be defined as a non-emulsified, colloidal dispersion of a polymer in minutely, finely-divided, particulate form in a continuous non-volatile plasticizer phase wherein the plasticizer is a partial solvent for the polymer particles at low temperatures, such as room temperature, but which will completely solvate the polymer particles at elevated temperatures, such as those used normally to fabricate the polymer thermally, to produce a continuous coherent homogeneous gel upon cooling. That is the definition contemplated in this application. The particles to be used in a plastisol should preferably be spherically shaped to present as small a particle surface as possible for minimum solvation. Also, a dispersion of spheres provides the lowest flow viscosity for charging molds, for cloth coating, and like operations. Cubes and irregularly shaped fragments of spherical particles are not desirable for use in plastisols. Such particles solvate too readily or pack too tightly giving a plastisol with a viscosity that is too high for easy workability.

The spheres of thermoplastic polymer to be utilizable in plastisols may have a wide range of individual diameters of from about 0.05 micron to 5 microns as measured from an electron micrograph. It is preferred however to use polymers with an average particle diameter of from 0.3 to 1 micron and with a minimum of particles outside of this range. Polymeric spheres with an average diameter significantly smaller than 0.3 micron will solvate too rapidly, causing premature gelation, and thus shortening the possible storage time of the plastisol before use. Large particles tend to settle out of suspension. When any of the characteristics of a polymer is significantly different from those listed above, any attempt at preparing a commercially useful plastisol will be unsuccessful.

The prior methods of preparing polymers for use in plastisol applications have consisted of preparing a latex by conventional procedures and to isolate the product by spray drying. However, with the conventional latexes the particles are extremely small so that agglomeration of several particles is required to arrive at a size useful in plastisols. Such agglomerates are not smooth spheres, are not of regular size, and are difficult to prepare. Other methods of preparing plastisol polymers consisted of using conventional suspension polymerization techniques and of grinding the dried particles to the proper size resulting in non-spherical, irregularly sized particles.

It would be desirable to have and it is the principal object of this invention to provide a process for preparing polymers of a particulate size that is useful for plastisol formation.

It is a further object to provide such a process whereby the resultant polymer particles are non-agglomerated, discrete spheres which are non-porous in structure.

The above and related objects are accomplished by means of a process whereby an aqueous phase is prepared containing an inorganic persulfate polymerization catalyst and certain amounts of a reaction product of certain alkanols and sulfuric acid, after which vinyl chloride monomer is added thereto and caused to polymerize while agitated. The polymer is isolated by spray drying the resultant latex.

Although the process is particularly well adapted for preparing polyvinylchloride, it may also be used for preparing copolymers of vinyl chloride with minor amounts of other monoethylenically unsaturated monomers, such as vinyl acetate.

As is true with most other emulsion polymerization processes, this process requires a water soluble catalyst. It has been found that optimum results are obtained when a redox catalyst consisting of potassium persulfate and sodium bisulfite is employed although other inorganic water soluble persulfates and bisulfites may be used. The concentration of each element of this redox system may be varied within wide limits depending upon the rate of polymerization desired. It is preferable to employ each element in a concentration of about 0.1 to 2.0 percent by weight of the monomers and within these limits the particle size and shape of the polymer is not significantly affected.

It is likewise preferred to agitate the mixture during polymerization to effect the dispersion of the monomer phase into droplets and also to attain more efficient and uniform heat transfer throughout the polymerization system. Agitation, except at extreme limits, has little to no effect on the final particle size of the polymer. However, very high rates of agitation, such as those of turbulence, are impractical and uneconomical and may affect the polymerization characteristics. When agitation is discontinued after the monomer is dispersed but before polymerization has proceeded past the sticky state, there may be some coalescence, agglomeration, and settling of the particles.

The latexes are preferably prepared with a non-volatile solids content of from about 20 to about 30 percent by weight or a phase ratio of about 2.5 to 3 parts water to each part of monomer. When the latexes contain less than about 20 percent of non-volatile solids, the process becomes unattractive economically. Latexes prepared by this process containing more than about 30 percent of non-volatile solids are relatively unstable to mechanical force and to storage and may become coagulated prior to drying.

The polymerization may be carried out at the usual temperatures of the emulsion polymerization of vinyl chloride. Usually these temperatures range between about 25° C. to about 50° C. It is preferred to operate at about 25 to 35° C.

The wetting agent of the process is one of the reaction products of certain alkanols and sulfuric acid. The alkanols which have been found to result in the desired reaction products are those monohydroxy alkanols containing from 6 to 10 carbon atoms. Octyl alcohol gives the best results and is accordingly preferred. Butyl and lauryl alcohols do not produce the desired wetting agent. The wetting agent is prepared by thoroughly mixing the 6 to 10 carbon alkanol with the sulfuric acid in certain amounts and under certain temperature conditions. Either of the ingredients may be used in a ratio of about 2 to 1 with respect to the other ingredient without destroying or significantly altering the emulsifying properties of the polymerization system provided that the total amount of both ingredients does not exceed about 4 percent of the weight of the monomers. No particular advantage accrues from the use of other than equimolar proportions of the two ingredients and such use is wasteful of the ingredient in excess.

The desired reaction product is prepared independently of the polymerization system and added without isolation or other refinement or purification. The alcohol and sulfuric acid are thoroughly mixed so that the reaction mixture is maintained at a temperature between about 50° C. and 150° C. Higher or lower temperatures favor the production of other reactions or of other equilibria, and the resulting product has no effectiveness in preparing the desired polymer by this process. The desired reaction product, hereinafter called an alkyl sulfuric acid, is believed to be an intermediate in the preparation of an olefin and/or the preparation of an alkyl sulfate.

To achieve best results the reaction product must be thoroughly distributed throughout the aqueous phase before the monomers are added. Thus the reaction product is most conveniently dispersed in the water before the addition of the catalyst and monomers.

It has been found that each ingredient is preferably used in a concentration of from about 0.2 to 2.0 percent based on the weight of monomer. When substantially less than 0.2 percent is used, there is insufficient wetting agent present to cause and maintain the dispersion. When more than 2 percent is used the particle size becomes so fine as to destroy the effectiveness of the process. It has been found that best results are obtained in the process when each ingredient is used in a concentration of about 0.5 percent of the weight of the monomers.

Following polymerization the latex dispersion is dried by the conventional spray drying techniques, wherein the latex is atomized through a nozzle into a large heated forced air chamber. Such techniques are well known and an operator will be able to determine useful feed rates and temperatures for his apparatus with a minimum of experimentation.

The process of this invention produces non-aggregated particles which satisfy the above described requirements as to shape and size. Plastisols made from these polymers are highly thixotropic and thus are readily processable in the conventional fabrication techniques. The polymers prepared by many of the prior processes frequently result in dilatant plastisols which are difficult to work and to fabricate. Still further advantages of these polymers are exceptional clarity and heat stability.

The operation and advantages of this process will be more apparent from the following illustrative example wherein all parts and percentages are by weight.

*Example*

A reaction product was prepared by mixing 0.5 part of octyl alcohol and 0.5 part sulfuric acid at room temperature. The temperature was allowed to rise to about 70° C. After cooling the octyl sulfuric acid was introduced into a closed vessel fitted with a coaxial agitator and jacketed for temperature control containing 300 parts of water, 0.1 part potassium persulfate and 0.1 part sodium bisulfite. The aqueous phase was agitated for 15 minutes to assure dispersion, the temperature was adjusted to 25° C., and 100 parts vinyl chloride were fed into the vessel after the air had been displaced with nitrogen. The dispersion of monomer was formed by operating the agitator at 140 r.p.m. after which it was slowed to 80 r.p.m. When a 25 percent pressure drop was shown, the batch was cooled, vented, and evacuated. After filtering to remove any precoagulum the latex was spray dried. The average individual particle diameters of the unbroken, non-agglomerated spheres were within the range from 0.5 to 0.75 micron. The polymer was compression molded into test samples and was found to be exceptionally clear and transparent. The molded samples showed good thermal stability when compared to other polyvinyl chloride samples. Satisfactory plastisols were prepared using dioctyl phthalate as a plasticizer.

In a similar manner, reaction products of sulfuric acid were made using hexyl and decyl alcohols, and when used in the same polymerization system as above, identical results were obtained.

By way of contrast when butyl and lauryl alcohols were used in place of the octyl alcohol to react with sulfuric acid and the reaction products were similarly employed, no latex was obtained. Also when phosphoric acid was substituted for the sulfuric acid no latex resulted.

We claim:

1. A process for preparing polyvinyl chloride suitable for use in making plastisols wherein vinyl chloride is dispersed into an aqueous phase consisting of (1) from 2.5 to 3 parts water for each part of monomer, (2) catalytic amounts of a water-soluble inorganic persulfate polymerization catalyst, and (3) from 0.4 to 4 percent of the weight of monomers of a wetting agent, the so-formed dispersion is subjected to a temperature of from about 25 to about 50° C. and the polymer is isolated and dried, wherein said wetting agent is prepared immediately prior to polymerization by mixing at from 50 to 150° C. from 1 to 2 parts by weight of sulfuric acid with from 2 to 1 parts by weight of a monohydroxy alkanol having from 6 to 10 carbon atoms and is dispersed in said aqueous phase before any of said monomers are added.

2. The process claimed in claim 1 wherein the alkyl sulfuric acid is the reaction product of about equimolar amounts of sulfuric acid and said alkanol.

References Cited in the file of this patent

UNITED STATES PATENTS

| 2,462,354 | Brubaker et al. | Feb. 22, 1949 |
| 2,615,009 | St. John et al. | Oct. 21, 1952 |
| 2,674,585 | Condo et al. | Apr. 6, 1954 |
| 2,674,593 | Condo et al. | Apr. 6, 1954 |
| 2,713,563 | Kuhn | July 19, 1955 |

FOREIGN PATENTS

| 702,794 | Great Britain | Jan. 20, 1954 |
| 740,947 | Great Britain | Nov. 23, 1955 |

OTHER REFERENCES

Brewster: "Organic Chemistry," Prentice-Hall (1953), page 123.